Figures 1, 2:
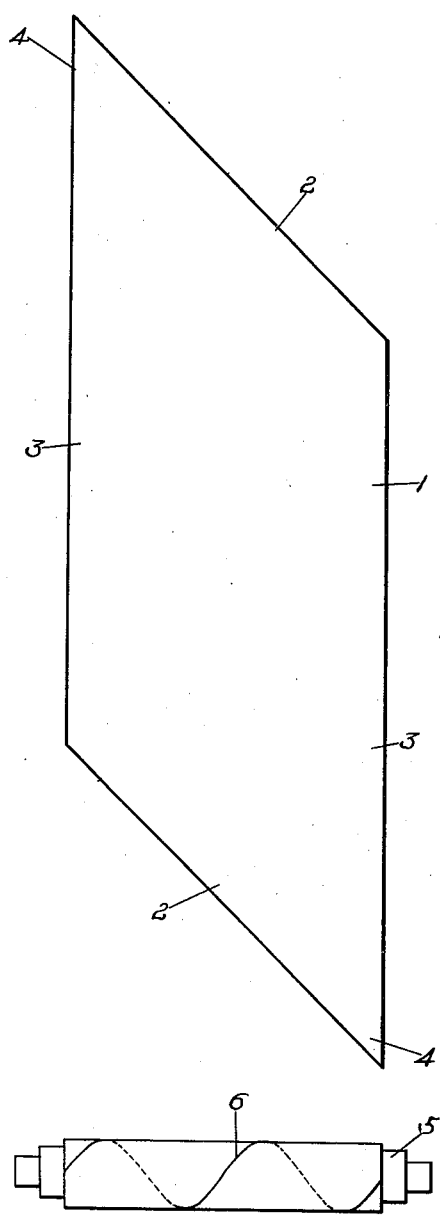

May 29, 1923.

W. H. KEMPTON 1,456,816

METHOD OF MAKING TUBES

Filed Sept. 3, 1919

WITNESSES:
J. B. Merrill
O. E. Bee.

INVENTOR
Willard H. Kempton.
BY
Wesley G. Carr
ATTORNEY

Patented May 29, 1923.

1,456,876

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF MAKING TUBES.

Application filed September 3, 1919. Serial No. 321,494.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Methods of Making Tubes, of which the following is a specification.

My invention relates to tubes formed of fibrous sheet material associated with a binder which is adapted to harden under the application of heat and pressure and it has, for its primary object, the provision of a method by which tubes, of the above designated character, may be made homogeneous in structure and by which the rapidity of their production shall be facilitated.

Difficulty has been experienced, in forming tubes of fibrous material, impregnated with a suitable binder, by methods of manufacture known heretofore. The tubes are ordinarily formed by impregnating the sheet material and by winding it upon a mandrel, either under the application of heat and pressure while the material is being wound or by winding the impregnated material upon the mandrel and subsequently subjecting it to heat and pressure. Difficulty has been experienced in obtaining a smooth and uniform roll of material upon the mandrel which is largely due to a tendency of the material to roll unevenly upon the mandrel, at the beginning of the operation.

One object of my invention resides, therefore, in the provision of a method by which material may be readily so started to roll upon a mandrel as to form a tube which shall be uniform and homogeneous in structure.

With these and other objects in view, my invention will be more fully described, illustrated in the drawings, in the several views of which corresponding numerals indicate like parts, and then particularly pointed out in the claims.

In the drawings, Fig. 1 is a plan view of a sheet of material prepared to be employed in forming a tube in accordance with my invention, and Fig. 2 is an elevation of a tube wound upon a mandrel in accordance with my invention.

In practising my invention, I may construct a tube by employing a suitable sheet material which may be impregnated with a binder. The sheet material is preferably cut, at its ends, to provide tapered portions which may be more readily started to roll upon a mandrel than straight ends. The angle, at which the ends of the material are cut, may be varied at will, but the ends are, preferably, both cut at the same angle to the edges of the material because this insures an equal amount of material being rolled upon the mandrel at all points.

In Fig. 1 is shown a sheet 1 having its ends 2 cut at an angle to the edges 3 thereof. The ends 2 are preferably cut at the same angle and in such manner that lines drawn along the ends shall be substantially parallel. The angle, at which the ends are cut to the edges, may be varied but it should be sufficiently acute to provide tapered points 4, one of which may be started upon a mandrel.

The sheet 1 may be of any suitable fibrous material, such as muslin, duck or paper, and it may be impregnated with a suitable binder, such as a phenolic condensation product. The sheet is preferably impregnated with the binder which is then dried to facilitate the handling of the material. After the sheet has been properly impregnated and cut, it may be wound upon a mandrel 5, as indicated in Fig. 2. The wave line 6, shown in Fig. 2, indicates the disposition of the tapered ends of the sheet material, which is last disposed about the mandrel. As here shown, the material is distributed evenly across the mandrel and, therefore, insures a uniform roll.

It will be appreciated that, by providing tapered ends for the sheet material, it may be more readily rolled about a mandrel to form a tube because it is difficult to start a straight-edge material upon a mandrel and maintain an even and uniform roll which contains no crimped portions. It is especially advantageous to obtain a smooth, uniform roll in the manufacture of fibrous tubes, because any crimped portions will tend to reduce the ultimate strength of the finished tubes. Heat and pressure may be applied to the material while it is being wound about the mandrel or the material may be wound about the mandrel and then be subjected to heat and pressure to compact the material and to harden the binder.

Although I have shown and specifically described a method of constructing tubes in accordance with my invention, it will be apparent that minor changes may be made therein without departing from the spirit of my invention, and I desire, therefore, that no limitations shall be imposed except such as are indicated in the appended claims.

I claim as my invention:—

1. A method of making tubes that comprises cutting a sheet of material to provide tapered, substantially parallel ends therefor, impregnating the sheet with an adhesive, rolling the material to form a tube and applying heat and pressure thereto to compact the material and to harden the adhesive.

2. A method of making tubes that comprises cutting a sheet of material to provide tapered, substantially parallel ends therefor, impregnating the sheet with an adhesive, rolling the material to form a tube having a uniform distribution of material therein and applying heat and pressure thereto to compact the material and to harden the adhesive.

3. A method of making tubes that comprises cutting a sheet of material to provide tapered, substantially parallel ends therefor, impregnating the sheet with an adhesive, drying the impregnated sheet, winding the sheet upon a mandrel to form a tube having a uniform distribution of material therein and applying heat and pressure to compact the material and to harden the adhesive.

In testimony whereof, I have hereunto subscribed my name this 25th day of Aug., 1919.

WILLARD H. KEMPTON.